(12) United States Patent
Horiba et al.

(10) Patent No.: US 12,487,077 B2
(45) Date of Patent: Dec. 2, 2025

(54) OPTICAL AXIS ADJUSTMENT JIG AND OPTICAL AXIS ADJUSTMENT METHOD

(71) Applicants: TOYOTA JIDOSHA KABUSHIKI KAISHA, Toyota (JP); PRIMEARTH EV ENERGY CO., LTD., Kosai (JP); Prime Planet Energy & Solutions, Inc., Tokyo (JP)

(72) Inventors: Keito Horiba, Toyota (JP); Taichi Urakami, Nissin (JP); Seiji Ishizu, Toyota (JP); Kazutoshi Iwata, Ichinomiya (JP); Masakazu Umehara, Toyota (JP); Naoya Kishimoto, Nagoya (JP)

(73) Assignees: TOYOTA JIDOSHA KABUSHIKI KAISHA, Toyota (JP); TOYOTA BATTERY CO., LTD., Kosai (JP); Prime Planet Energy & Solutions, Inc., Tokyo (JP)

( * ) Notice: Subject to any disclaimer, the term of this patent is extended or adjusted under 35 U.S.C. 154(b) by 320 days.

(21) Appl. No.: 18/133,712

(22) Filed: Apr. 12, 2023

(65) Prior Publication Data
US 2023/0332881 A1    Oct. 19, 2023

(30) Foreign Application Priority Data
Apr. 15, 2022    (JP) ................ 2022-067830

(51) Int. Cl.
*G01B 11/06* (2006.01)
*B25B 11/00* (2006.01)
(Continued)

(52) U.S. Cl.
CPC .......... *G01B 11/0691* (2013.01); *B25B 11/00* (2013.01); *G01B 5/004* (2013.01); *G01B 11/06* (2013.01); *G02B 27/62* (2013.01)

(58) Field of Classification Search
CPC ... B25B 11/00; G01B 11/0691; G01B 5/0004; G01B 11/06; G01B 2210/44; G01B 2210/50; G02B 27/62
(Continued)

(56) References Cited

U.S. PATENT DOCUMENTS

| 8,810,770 B2 * | 8/2014 | Maehara ............. G03F 7/70875 355/72 |
| 2019/0360796 A1 * | 11/2019 | Fujimoto ............. G01B 11/272 |
| 2021/0213566 A1 * | 7/2021 | Flores .................. B23K 26/706 |

FOREIGN PATENT DOCUMENTS

| CN | 103256889 A | * | 8/2013 | |
| CN | 104160238 A | * | 11/2014 | ............... D21F 7/06 |

(Continued)

OTHER PUBLICATIONS

Translation JP_2005024468 (Okabe) (Year: 2005).*
(Continued)

*Primary Examiner* — Peter J Macchiarolo
*Assistant Examiner* — Monica S Young
(74) *Attorney, Agent, or Firm* — Sughrue Mion, PLLC

(57) ABSTRACT

An optical axis adjustment jig includes a main unit portion that is configured to be disposed between a pair of head units, and is fashioned in a flat plate shape. The main unit portion includes a reference portion for adjusting a distance between the head units, and an inclination of an optical axis of each of the head units, and a screen portion for aligning the optical axes of the head units. The reference portion and the screen portion are disposed arrayed in a direction orthogonal to a thickness direction of the main unit portion.

3 Claims, 7 Drawing Sheets

(51) Int. Cl.
*G01B 5/004* (2006.01)
*G02B 27/62* (2006.01)

(58) Field of Classification Search
USPC .......................................................... 73/1.79
See application file for complete search history.

(56) References Cited

FOREIGN PATENT DOCUMENTS

| | | | | | |
|---|---|---|---|---|---|
| CN | 109827511 | B | * | 12/2020 | |
| CN | 116826137 | A | * | 9/2023 | |
| JP | 2001350224 | A | * | 12/2001 | |
| JP | 2005024468 | A | * | 1/2005 | |
| JP | 2019-002721 | A | | 1/2019 | |
| JP | 2019203866 | A | * | 11/2019 | ............. G01B 11/06 |
| JP | 2024007731 | A | * | 1/2024 | ............. G01B 11/02 |
| WO | 2012/039341 | A1 | | 3/2012 | |
| WO | WO-2022113915 | A1 | * | 6/2022 | ............. C23C 24/04 |

OTHER PUBLICATIONS

Translation P_2001350224 (Nakamura) (Year: 2001).*
Translation CN_104160238 (Year: 2014).*
Translation CN_103256889 (Xu) (Year: 2013).*

* cited by examiner

OPTICAL AXIS ADJUSTMENT JIG AND OPTICAL AXIS ADJUSTMENT METHOD

CROSS-REFERENCE TO RELATED APPLICATION

This application claims priority to Japanese Patent Application No. 2022-067830 filed on Apr. 15, 2022, incorporated herein by reference in its entirety.

BACKGROUND

1. Technical Field

The present disclosure relates to an optical axis adjustment jig and an optical axis adjustment method.

2. Description of Related Art

Japanese Unexamined Patent Application Publication No. 2019-2721 (JP 2019-2721 A), for example, discloses a pair of head units, disposed so as to face each other, being used to measure thickness of a sheet object to be measured passing between these head units. The head units make up part of a confocal displacement meter. In order to accurately measure the thickness of the sheet object to be measured using the head units, it is necessary to align an optical axis of one head unit with an optical axis of the other head unit.

SUMMARY

In order to align the optical axes of the head units described in JP 2019-2721 A, normally, two dedicated jigs, which are a first dedicated jig for adjustment of distance between the head units and inclination of each optical axis, and a second dedicated jig for aligning the optical axes, are used.

However, when a thickness of a sheet body is measured by the head units while the sheet body is being conveyed by conveying rollers, the dedicated jigs may interfere with the conveying rollers.

It is an object of the present disclosure to provide an optical axis adjustment jig and an optical axis adjustment method using the same that enable aligning of an optical axis of each of a pair of head units without interfering with conveying rollers.

According to an aspect of the present disclosure, an optical axis adjustment jig used to adjust an optical axis of each of a pair of head units disposed at positions sandwiching a sheet body conveyed by a conveying roller, in a thickness direction of the sheet body, and configured to measure a thickness of the sheet body, includes a main unit portion that is configured to be disposed between the head units, and is fashioned in a flat plate shape.

The main unit portion includes
- a reference portion for adjusting a distance between the head units, and an inclination of the optical axis of each of the head units, and
- a screen portion for aligning the optical axes of the head units.

The reference portion and the screen portion are disposed arrayed in a direction orthogonal to a thickness direction of the main unit portion.

Also, according to an aspect of the present disclosure, an optical axis adjustment method for adjusting an optical axis of each of a pair of head units disposed at positions sandwiching a sheet body conveyed by a conveying roller, in a thickness direction of the sheet body, and configured to measure a thickness of the sheet body, includes

- a preparation step of preparing the optical axis adjustment jig,
- a disposing step of disposing the optical axis adjustment jig such that the reference portion is positioned between the head units,
- a first adjustment step of adjusting a distance between the head units to each other, and an inclination of the optical axis of each of the head units, by emitting light from each of the head units toward the reference portion,
- a sliding step of sliding the optical axis adjustment jig such that the screen portion is positioned between the head units, and
- a second adjustment step of aligning the optical axis of each of the head units, by emitting light from each of the head units toward the screen portion.

According to the present disclosure, an optical axis adjustment jig and an optical axis adjustment method using the same can be provided that enable aligning of optical axes of each of a pair of head units without interfering with conveying rollers.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
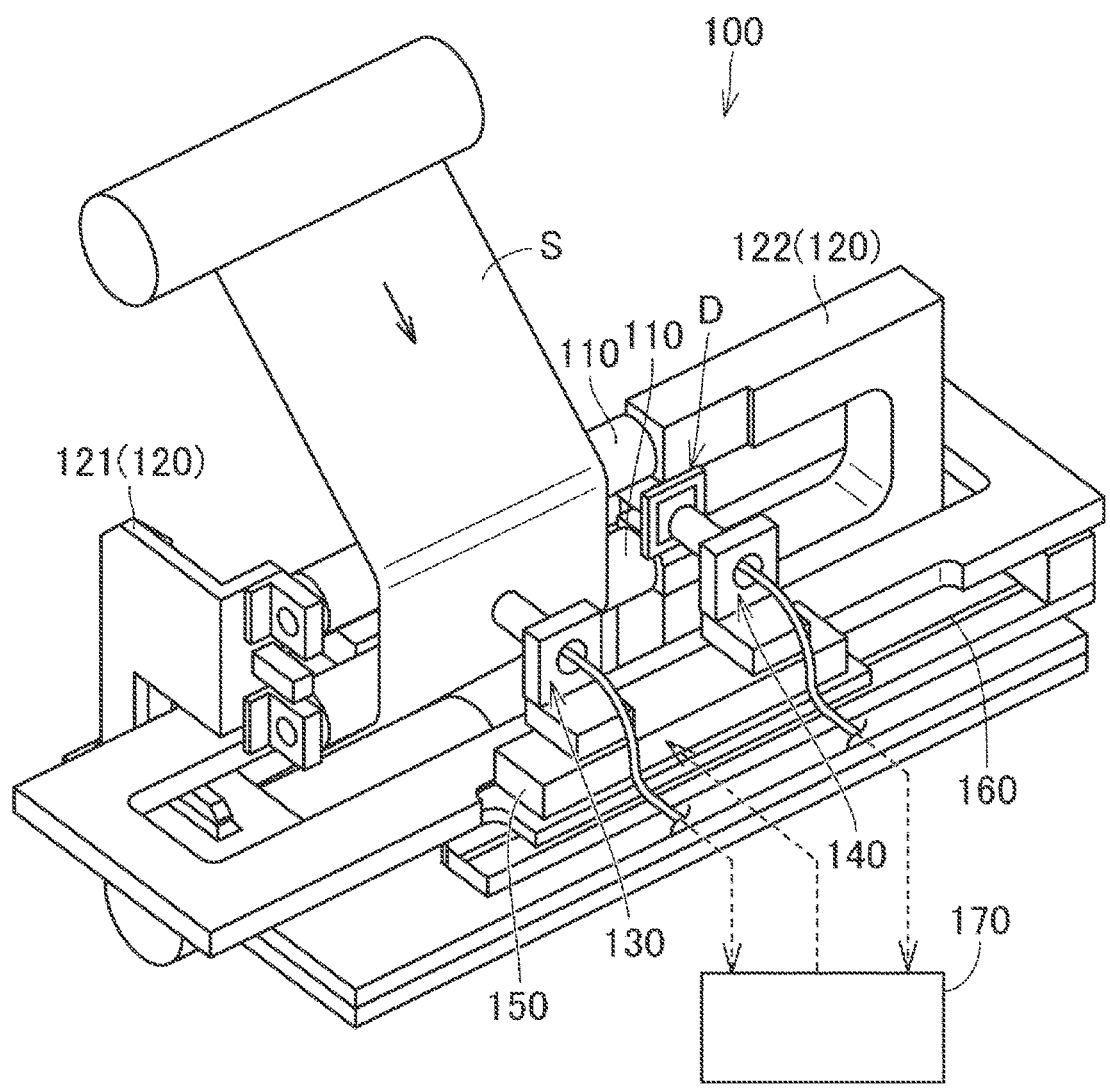
FIG. 1 is a perspective view schematically illustrating measurement of thickness of a sheet body by a measuring device according to an embodiment of the present disclosure.

An embodiment of the present disclosure will be described with reference to the drawings. Note that in the drawings referenced below, same or corresponding members are denoted by the same signs.

Figure 2:
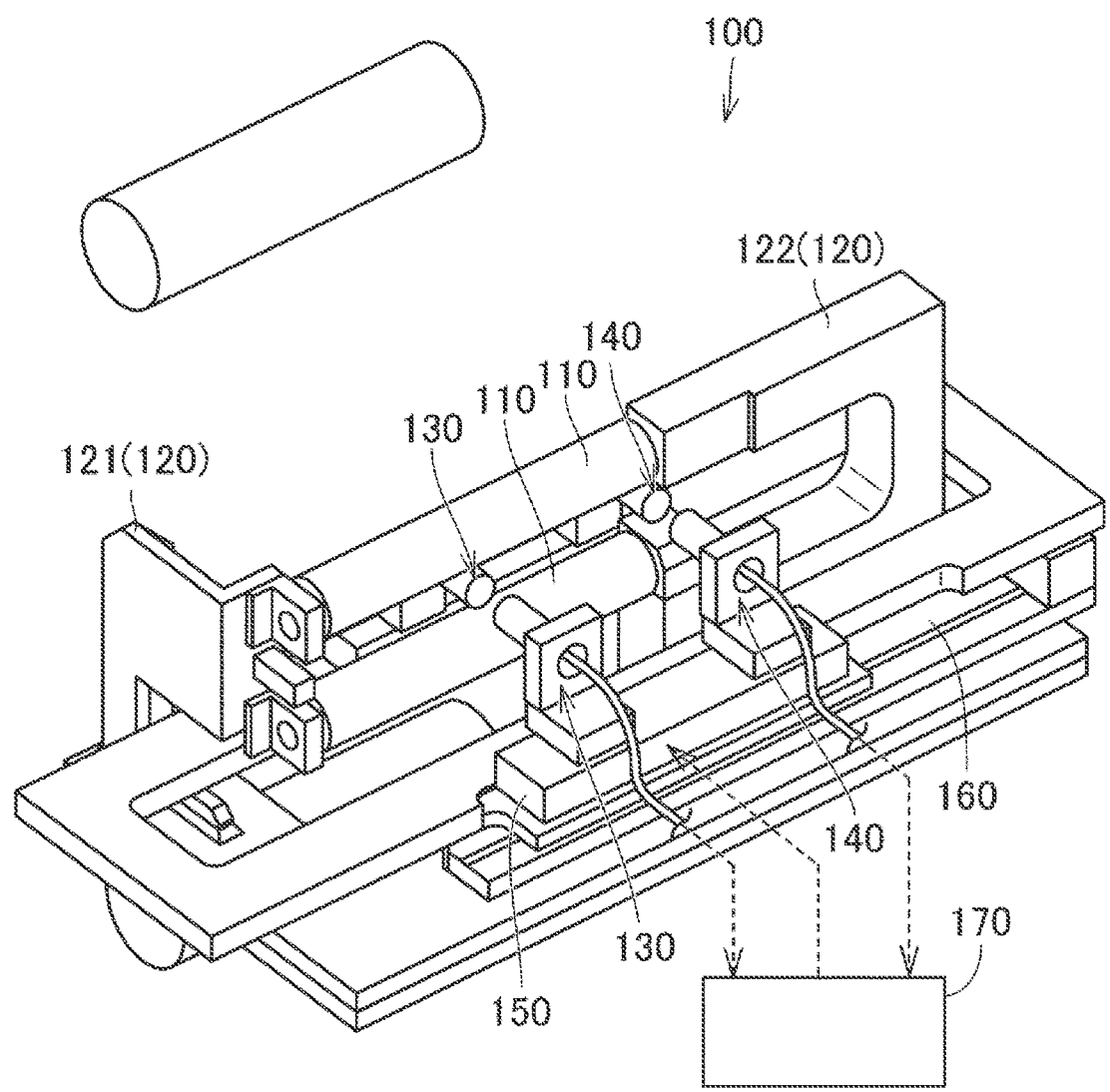
FIG. 2 is a perspective view schematically illustrating a configuration of the measuring device.
Figure 3:
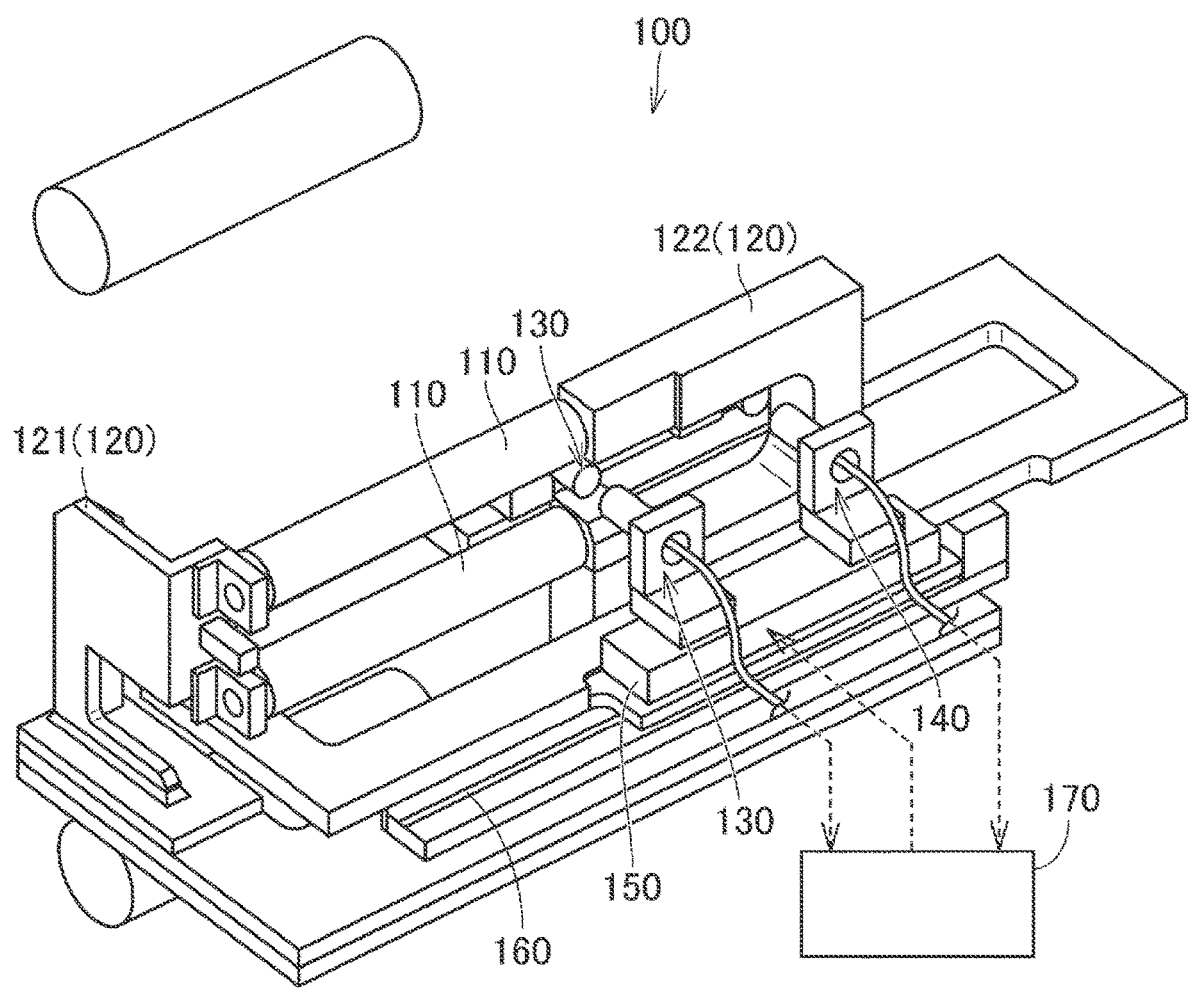
FIG. 3 is a perspective view schematically illustrating the configuration of the measuring device.

FIG. 1 is a perspective view schematically illustrating measurement of thickness of a sheet body by a measuring device according to an embodiment of the present disclosure. FIGS. 2 and 3 are perspective views schematically illustrating a configuration of the measuring device. The measuring device 100 is a device that is capable of measuring thickness of the sheet body S while conveying this sheet body S that is thin-film-like. An example of the sheet body S is an electrode used in a power storage cell.

As illustrated in FIGS. 1 to 3, the measuring device 100 includes a pair of conveying rollers 110, a roller holding portion 120, a pair of measurement head units 130, a pair of correction head units 140, a support member 150, a slide rail 160, and a control unit 170.

Figure 4:
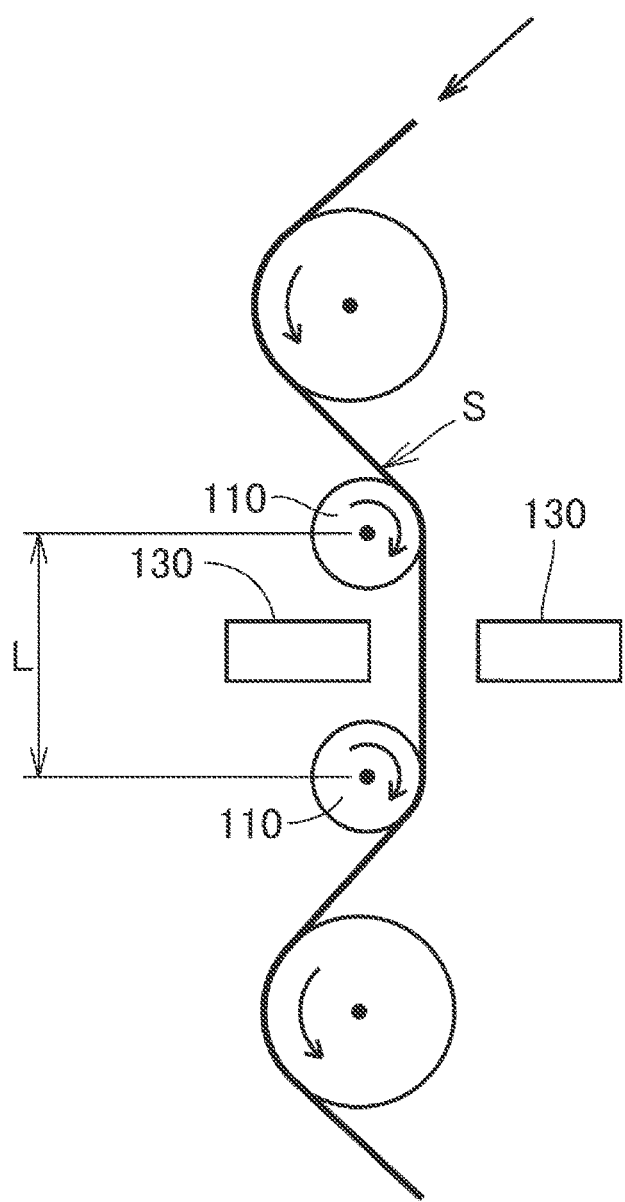
FIG. 4 is a frontal view schematically illustrating the configuration of the measuring device.

The conveying rollers 110 are capable of conveying the sheet body S. Each conveying roller 110 is rotatable about a rotation axis. The conveying rollers 110 are disposed parallel to each other. A distance L between center axes of the conveying rollers 110, illustrated in FIG. 4, is set to 150 mm, for example.

The roller holding portion 120 holds the conveying rollers 110. The roller holding portion 120 has a first holding portion 121 and a second holding portion 122.

The first holding portion 121 is disposed on one side of the conveying rollers 110 in a direction parallel to the rotation axes of the conveying rollers 110, and holds one end of each of the conveying rollers 110. The first holding portion 121 has a first jig holding portion 121a that holds an optical axis adjustment jig 200, which will be described later. The first jig holding portion 121a has a form that extends in a direction connecting the rotation axes of each of the conveying rollers 110 with each other (up-down direction in FIG. 4) and in an orthogonal direction orthogonal to both of the rotation axes of the conveying rollers 110 (right-left direction in FIG. 4). In the present embodiment, the first jig holding portion 121a is made up of a bolt.

The second holding portion 122 is disposed on the other side of the conveying rollers 110 in a direction parallel to the rotation axis of the conveying rollers 110, and holds the other end of each of the conveying rollers 110. The second holding portion 122 has a second jig holding portion 122a that holds the optical axis adjustment jig 200. The second jig holding portion 122a has a form extending in the orthogonal direction. In the present embodiment, the second jig holding portion 122a is made up of a bolt.

The measurement head units 130 are equipment for measuring the thickness of the sheet body S. The measurement head units 130 are disposed at positions sandwiching the sheet body S in a thickness direction thereof. Specifically, the measurement head units 130 are disposed at positions sandwiching a portion of the sheet body S that is conveyed by the conveying rollers 110, at a position between the conveying rollers 110, from both sides in the thickness direction. The measurement head units 130 make up a so-called confocal displacement meter.

The correction head units 140 are used to correct changes in the form of the members, and changes in the thickness and so forth of the sheet body S, which occur due to temperature variation and so forth. The correction head units 140 have the same configuration as the measurement head units 130. The correction head units 140 are disposed at positions away from the measurement head units 130 in the direction parallel to the rotation axes of the conveying rollers 110. The correction head units 140 measure thickness of a dummy work D (see FIG. 1) while the measurement head units 130 are measuring the sheet body S. The thickness of the dummy work D is measured in advance. The dummy work D is made of a metal film or the like.

The support member 150 supports the measurement head units 130 and the correction head units 140 so that relative positions of the measurement head units 130 and the correction head units 140 are determined.

The support member 150 is capable of moving relative with respect to the conveying rollers 110 along a sliding direction parallel to the rotation axes of the conveying rollers 110. The support member 150 is capable of moving along the sliding direction between a normal position (position illustrated in FIGS. 1 and 2) and a setting position (position illustrated in FIG. 3). The normal position is a position at which the measurement head units 130 face the sheet body S in the direction connecting the rotation axes of the conveying rollers 110 with each other (up-down direction in FIG. 4) and the orthogonal direction orthogonal to each of the rotation axes of the conveying rollers 110 (right-left direction in FIG. 4), and at which the correction head units 140 face the dummy work D without facing the sheet body S. The setting position is a position at which the measurement head units 130 face the dummy work D without facing the sheet body S in the orthogonal direction, and the correction head units 140 face neither the sheet body S nor the dummy work D. The support member 150 is capable of moving both in the direction connecting the rotation axes of the conveying rollers 110 with each other and in the orthogonal direction.

The slide rail 160 has a form extending in a direction parallel to the rotation axes of the conveying rollers 110 (sliding direction). The slide rail 160 guides the movement of the support member 150 along the sliding direction, between the normal position and the setting position.

The control unit 170 adjusts the distance between the measurement head units 130, and so forth, based on results of measurement of the thickness of the dummy work D by the correction head units 140. Specifically, the control unit 170 controls the position of the support member 150 based on the results of measurement of the thickness of the dummy work D by the correction head units 140.

Figure 5:
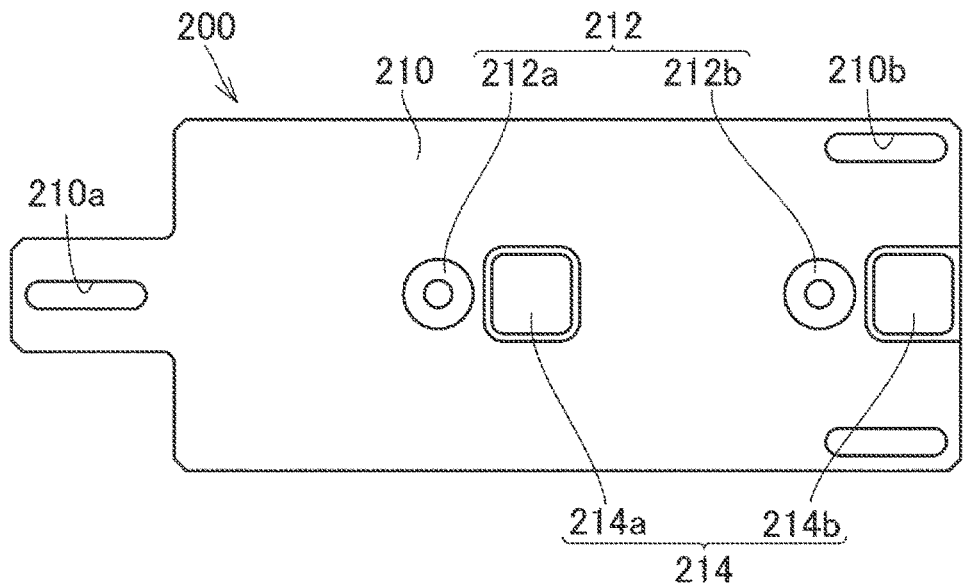
FIG. 5 is a front view of an optical axis adjustment jig.

Next, the optical axis adjustment jig 200 will be described with reference to FIG. 5. The optical axis adjustment jig 200 is a jig used to adjust an optical axis of each of the head units (the measurement head units 130 and the correction head units 140).

The optical axis adjustment jig 200 has a main unit portion 210 that can be disposed between the head units, and is formed in a flat plate shape. The main unit portion 210 includes a first held portion 210a detachably held by the first jig holding portion 121a, a second held portion 210b detachably held by the second jig holding portion 122a. In the present embodiment, the first held portion 210a and the second held portion 210b are formed as slots elongated in the sliding direction. Accordingly, the optical axis adjustment jig 200 is capable of moving between a first adjustment position (position illustrated in FIG. 6) and a second adjustment position (position illustrated in FIG. 7) along the sliding direction, in a state of being held by the first jig holding portion 121a and the second jig holding portion 122a.

The first adjustment position is a position at which the first jig holding portion 121a is in contact with one end of the first held portion 210a in the sliding direction, and the second jig holding portion 122a is in contact with one end of the second held portion 210b in the sliding direction.

The second adjustment position is a position at which the first jig holding portion 121a is in contact with the other end of the first held portion 210a in the sliding direction, and the second jig holding portion 122a is in contact with the other end of the second held portion 210b in the sliding direction.

The main unit portion 210 has a reference portion 212 and a screen portion 214.

The reference portion 212 is a portion for adjusting the distance between the head units 130 and 140, and the inclination of the optical axis of each of the head units 130 and 140. The reference portion 212 has a first reference element 212a and a second reference element 212b.

Figure 6:
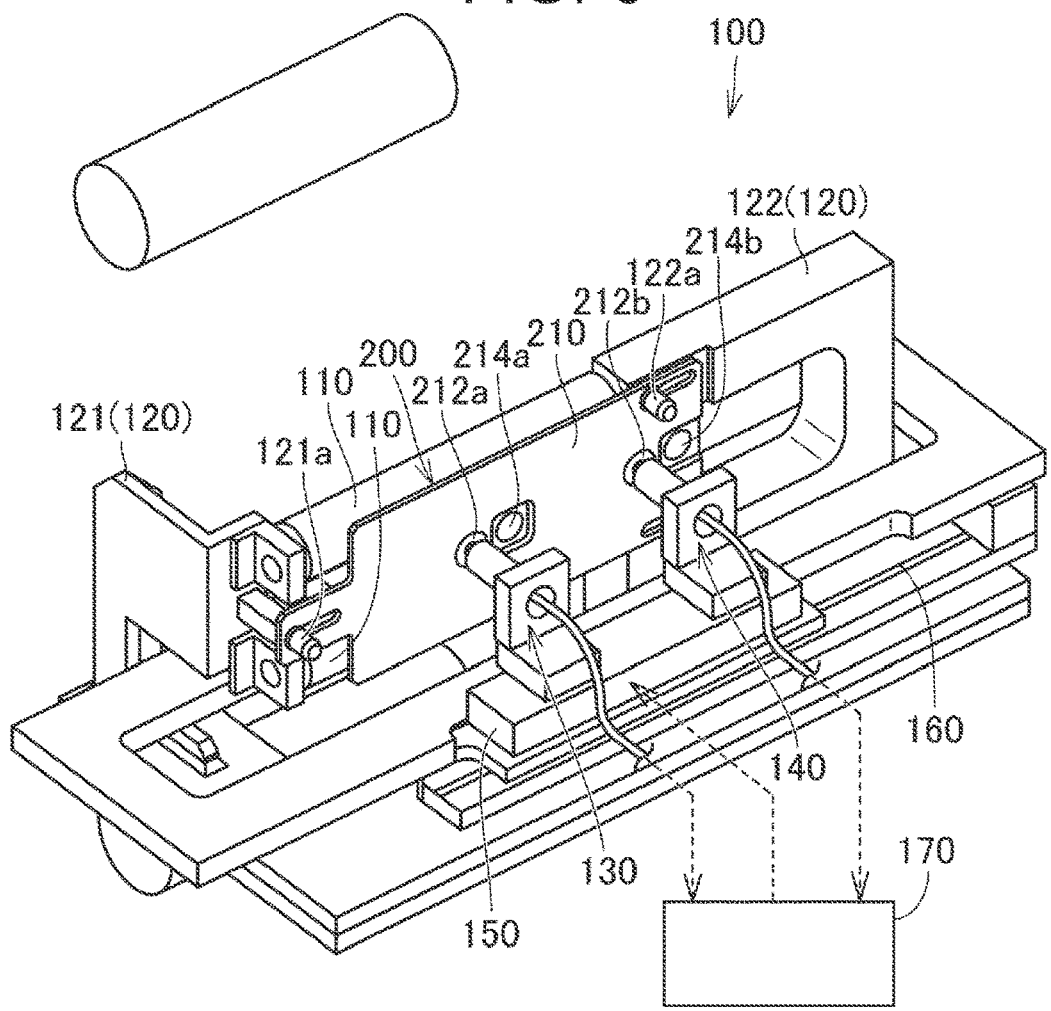
FIG. 6 is a diagram schematically illustrating a disposing step and a first adjustment step.

The first reference element 212a is a portion for adjusting the distance between the measurement head units 130, and the inclination of the optical axis of each of the measurement head units 130. The first reference element 212a is made up of a mirror that reflects light emitted from each of the measurement head units 130. As illustrated in FIG. 6, in a state in which the optical axis adjustment jig 200 is held by the first jig holding portion 121a and the second jig holding portion 122a at the first adjustment position, the first reference element 212a is situated at a position facing the measurement head units 130 in the orthogonal direction at the normal position.

The second reference element 212b is a portion for adjusting the distance between the correction head units 140, and the inclination of the optical axis of each of the correction head units 140. The second reference element 212b is made up of a mirror that reflects light emitted from each of the correction head units 140. The second reference element 212b is provided at a position away from the first reference element 212a in the direction parallel to the rotation axis of the conveying roller 110 (sliding direction). As illustrated in FIG. 6, in a state where the optical axis adjustment jig 200 is held by the first jig holding portion 121a and the second jig holding portion 122a at the first adjustment position, the second reference element 212b is situated at a position facing the correction head units 140 in the orthogonal direction at the normal position, i.e., at a position facing each measurement head unit 130 in the orthogonal direction at the setting position (position illustrated in FIG. 3).

The screen portion 214 is a portion for aligning the optical axes of the head units 130 and 140. The screen portion 214 is disposed so as to be arrayed with the reference portion 212 in the sliding direction. The screen portion 214 has a first screen element 214a and a second screen element 214b.

Figure 7:
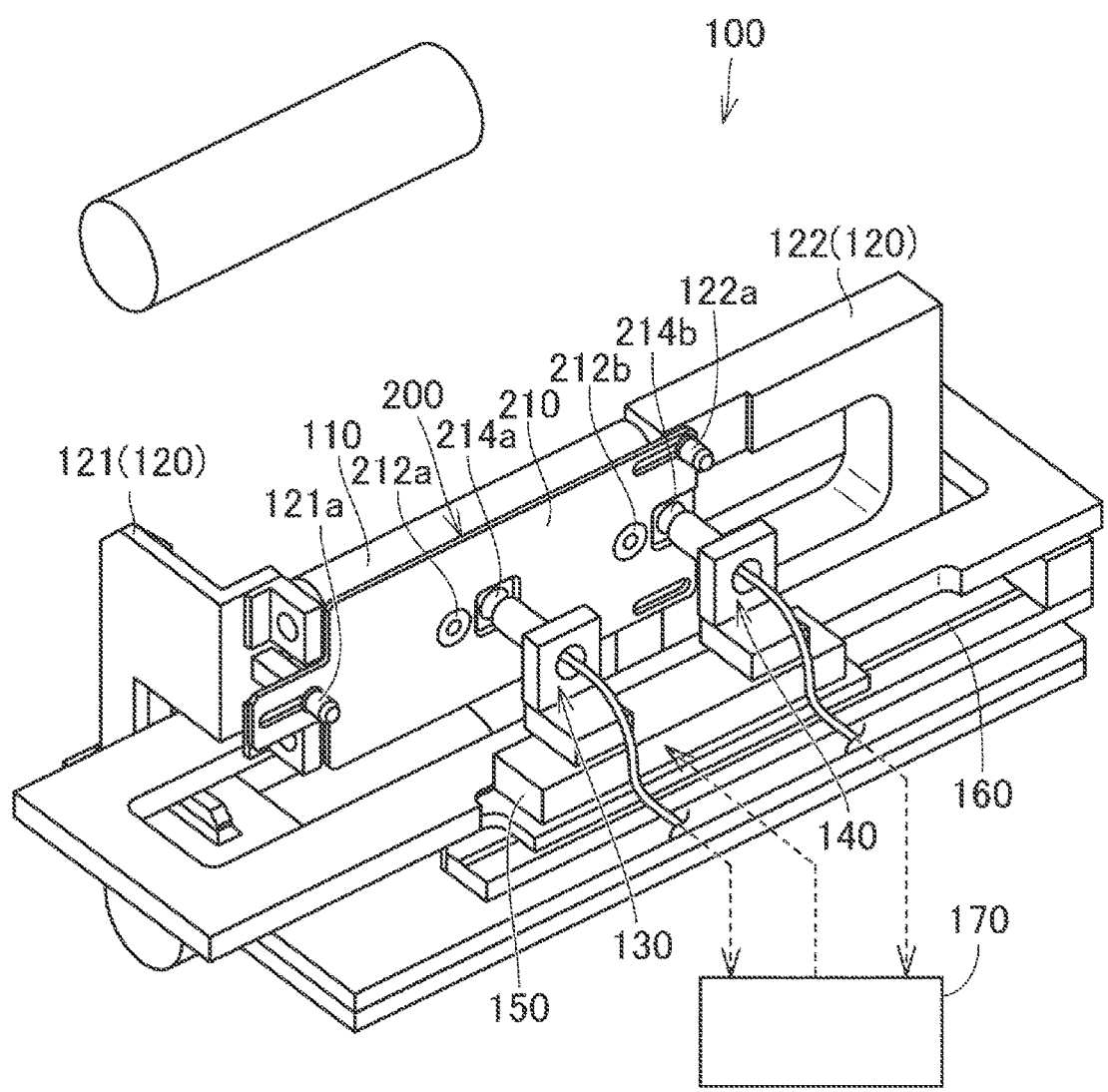
FIG. 7 is a diagram schematically illustrating a sliding step and a second adjustment step.

The first screen element 214a is a portion for aligning the optical axes of the measurement head units 130. The first screen element 214a transmits part of the light emitted from each measurement head unit 130 therethrough. The first screen element 214a is provided at a position adjacent to the first reference element 212a in the sliding direction. As illustrated in FIG. 7, in a state in which the optical axis adjustment jig 200 is held by the first jig holding portion 121a and the second jig holding portion 122a at the second adjustment position, the first screen element 214a is situated at a position facing the measurement head units 130 in the orthogonal direction at the normal position.

The second screen element 214b is a portion for aligning the optical axes of the correction head units 140. The second screen element 214b transmits part of the light emitted from each correction head unit 140 therethrough. The second screen element 214b is provided at a position adjacent to the second reference element 212b in the sliding direction. As illustrated in FIG. 7, in a state in which the optical axis adjustment jig 200 is held by the first jig holding portion 121a and the second jig holding portion 122a at the second adjustment position, the second screen element 214b is situated at a position facing the correction head units 140 in the orthogonal direction at the normal position. That is to say, in the present embodiment, the first reference element 212a, the first screen element 214a, the second reference element 212b, and the second screen element 214b are disposed arrayed in a straight line in that order.

Next, an optical axis adjustment method will be described with reference to FIGS. 6 to 8. The optical axis adjustment method includes a preparation step, a disposing step, a first adjustment process, a sliding step, a second adjustment step, a removal step, and a zero-calibration step.

In the preparation step, the measuring device 100 is prepared. In the preparation step, the optical axis adjustment jig 200 is prepared.

In the disposing step, the optical axis adjustment jig 200 is disposed such that the reference portion 212 is positioned between the head units 130 and 140. Specifically, as illustrated in FIG. 6, in the disposing step, the optical axis adjustment jig 200 is held by the first jig holding portion 121a and the second jig holding portion 122a at the first adjustment position, such that the first reference element 212a is positioned between the measurement head units 130 and the second reference element 212b is positioned between the correction head units 140.

In the first adjustment step, emitting light from each of the head units 130 and 140 toward the reference portion 212 enables adjustment of the distance between the measurement head units 130 to each other and the correction head units 140 to each other, and of the inclination of the optical axes of each of the head units 130 and 140. In the present embodiment, in the first adjustment step, light is emitted from each of the measurement head units 130 toward the first reference element 212a, thereby adjusting the distance between the measurement head units 130 and adjusting the inclination of the optical axis of each of the measurement head units 130. Also, light is emitted from each of the correction head units 140 toward the second reference element 212b, thereby adjusting the distance between the correction head units 140 and the inclination of the optical axis of each of the correction head units 140.

In the sliding step, the optical axis adjustment jig 200 is slid so that the screen portion 214 is positioned between the head units 130 and 140. Specifically, as illustrated in FIG. 7, in the sliding step, the optical axis adjustment jig 200 is slid from the first adjustment position to the second adjustment position, such that the first screen element 214a is positioned between the measurement head units 130, and the second screen element 214b is positioned between the correction head units 140.

In the second adjustment step, by emitting light from each of the head units 130 and 140 toward the screen portion 214, the optical axes of the head units 130 and 140 are aligned. Specifically, in the second adjustment step, emitting light from each of the measurement head units 130 toward the first screen element 214a enables the optical axes of the measurement head units 130 to be aligned, and also, emitting light from each of the correction head units 140 toward the second screen element 214b enables the optical axes of the correction head units 140 to be aligned.

In the removal step, the optical axis adjustment jig 200 is removed from the measuring device 100.

Figure 8:
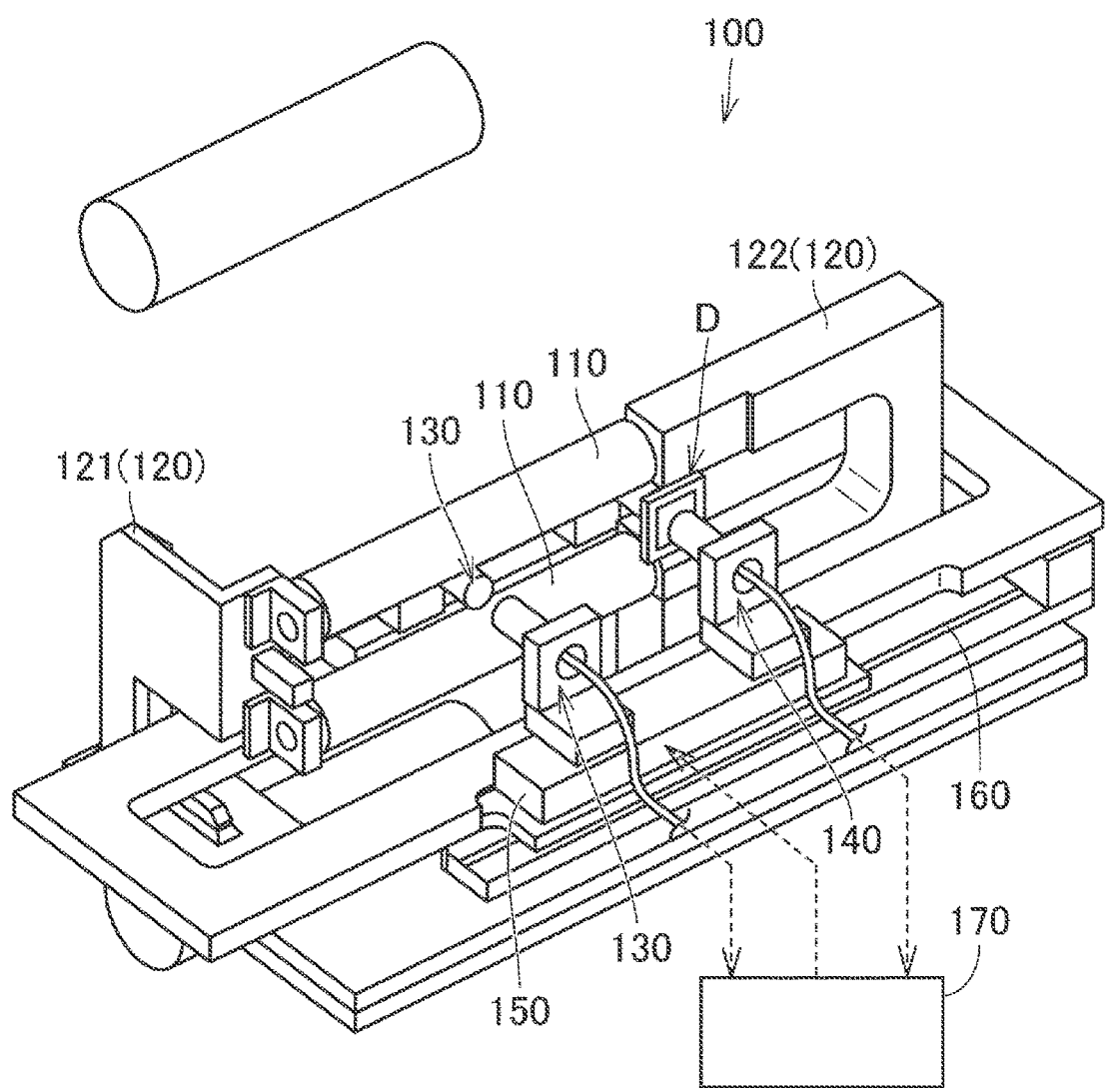
FIG. 8 is a diagram schematically illustrating a zero-calibration step.

In the zero-calibration step, after the dummy work D is attached to the second holding portion 122, the thickness of the dummy work D is first measured by the correction head units 140, as illustrated in FIG. 8. By comparing the measured value at this time with the thickness of the dummy work D acquired in advance, the control unit 170 controls the support member 150 such that zero-calibration of the correction head units 140 is performed.

Subsequently, the support member 150 is moved from the normal position to the setting position (the position illustrated in FIG. 3), and the thickness of the dummy work D is measured by the measurement head units 130. By comparing the measured value at this time with the thickness of the dummy work D acquired in advance, the control unit 170 controls the support member 150 such that zero-calibration of the measurement head units 130 is performed.

Thereafter, the measurement head units 130 and the correction head units 140 are returned from the setting position to the normal position.

As described above, in the optical axis adjustment jig 200 according to the present embodiment, the main unit portion 210 that is formed as a flat plate shape has both the reference portion 212 and the screen portion 214, and accordingly, disposing the main unit portion 210 between the head units 130 and 140 and sliding the main unit portion 210 in a direction connecting the reference portion 212 and the screen portion 214 (sliding direction), can realize both of alignment of the optical axes of the head units 130 and 140, and doing away with the need to perform operations of replacing a dedicated jig having the reference portion 212 with a dedicated jig having the screen portion 214, while averting interference of the main unit portion 210 with the conveying rollers 110.

Note that in the above-described embodiment, the zero-calibration step may be performed after thickness measurement of one roll of the sheet body S is completed.

It will be appreciated by those skilled in the art that the exemplary embodiment described above is a specific example of the aspects described below.

Aspect 1

An optical axis adjustment jig used to adjust an optical axis of each of a pair of head units disposed at positions sandwiching a sheet body conveyed by a conveying roller, in a thickness direction of the sheet body, and configured to measure a thickness of the sheet body, includes
- a main unit portion that is configured to be disposed between the head units, and is fashioned in a flat plate shape.

The main unit portion includes
- a reference portion for adjusting a distance between the head units, and an inclination of the optical axis of each of the head units, and
- a screen portion for aligning the optical axes of the head units.

The reference portion and the screen portion are disposed arrayed in a direction orthogonal to a thickness direction of the main unit portion.

In this optical axis adjustment jig, the main unit portion that is formed as a flat plate shape has both the reference portion and the screen portion, and accordingly, disposing the main unit portion between the head units and sliding the main unit portion in a direction connecting the reference portion and the screen portion can realize both aligning of the optical axes of the head units, and doing away with the need to perform operations of replacing a dedicated jig having the reference portion with a dedicated jig having the screen portion, while averting interference with the conveying rollers.

Aspect 2

The optical axis adjustment jig according to aspect 1, wherein the reference portion includes
- a first reference element,
- a second reference element disposed at a position away from the first reference element in a direction parallel to a rotation axis of the conveying roller, the screen portion includes
- a first screen element, and
- a second screen element disposed at a position away from the first screen element in the direction parallel to the rotation axis of the conveying roller, and the first reference element, the first screen element, the second reference element, and the second screen element are disposed arrayed in a straight line in that order.

In this aspect, for example, the thickness of the sheet body can be measured by a pair of measurement head units, while measuring a dummy work by a pair of correction head units.

Aspect 3

An optical axis adjustment method for adjusting an optical axis of each of a pair of head units disposed at positions sandwiching a sheet body conveyed by a conveying roller, in a thickness direction of the sheet body, and configured to measure a thickness of the sheet body, includes
- a preparation step of preparing the optical axis adjustment jig according to aspect 1 or 2;
- a disposing step of disposing the optical axis adjustment jig such that the reference portion is positioned between the head units;
- a first adjustment step of adjusting a distance between the head units to each other, and an inclination of the optical axis of each of the head units, by emitting light from each of the head units toward the reference portion;
- a sliding step of sliding the optical axis adjustment jig such that the screen portion is positioned between the head units; and
- a second adjustment step of aligning the optical axis of each of the head units, by emitting light from each of the head units toward the screen portion.

Aspect 4

A measuring device, including a pair of conveying rollers disposed parallel to each other and configured to convey a sheet body;
- a pair of measurement head units disposed at positions sandwiching the sheet body conveyed by the conveying rollers, in a thickness direction of the sheet body, and configured to measure a thickness of a portion of the sheet body that is positioned between the conveying rollers;
- a pair of correction head units disposed at positions sandwiching a dummy work of which a thickness in a thickness direction of the dummy work is measured in advance, for measuring the thickness of the dummy work; and
- a control unit that adjusts a distance between the measurement head units, based on results of measurement of the thickness of the dummy work by the correction head units.

It should be noted that the embodiments disclosed herein are exemplary in all respects and should not be considered to be restrictive. The scope of the present disclosure is set forth in the claims, rather than the above description of the embodiment, and encompasses all modifications made within the meaning and scope equivalent to the claims.

What is claimed is:

1. An optical axis adjustment jig used to adjust an optical axis of each of a pair of measurement head units disposed at positions sandwiching a sheet body conveyed by a conveying roller, in a thickness direction of the sheet body, the measurement head units being configured to measure a thickness of the sheet body, the optical axis adjustment jig comprising:
    a main unit portion that is configured to be disposed between the measurement head units, and has a flat plate shape, the main unit portion comprising:

a mirror for adjusting a distance between the measurement head units, and an inclination of the optical axis of each of the measurement head units; and an opening for aligning the optical axes of the measurement head units, wherein the mirror and the opening are disposed in a direction in which the optical axis adjustment jig is configured to slide that is orthogonal to a thickness direction of the main unit portion and spaced apart from each other.

2. The optical axis adjustment jig according to claim 1, wherein the mirror comprises:

a first reference element; and a second reference element disposed at a position away from the first reference element in a direction parallel to a rotation axis of the conveying roller, wherein the opening comprises:

a first screen element; and a second screen element disposed at a position away from the first screen element in the direction parallel to the rotation axis of the conveying roller, and wherein the first reference element, the first screen element, the second reference element, and the second screen element are disposed in a straight line in that order.

3. An optical axis adjustment method for adjusting the optical axis of each of the pair of measurement head units by the optical axis adjustment jig according to claim 1, the optical axis adjustment method comprising:

disposing the optical axis adjustment jig such that the mirror is positioned between the measurement head units;

adjusting a distance between the measurement head units to each other, and an inclination of the optical axis of each of the measurement head units, by emitting light from each of the measurement head units toward the mirror, sliding the optical axis adjustment jig such that the opening is positioned between the measurement head units; and aligning the optical axis of each of the measurement head units, by emitting light from each of the measurement head units toward the opening.

* * * * *